(12) United States Patent
Lo et al.

(10) Patent No.: US 11,786,338 B2
(45) Date of Patent: Oct. 17, 2023

(54) DENTAL BAND DEVICE

(71) Applicant: Medicom Group Inc., Pointe-Claire (CA)

(72) Inventors: Brian Lo, Kowloon (HK); Richard Paré, Boucherville (CA); Gabrielle Poirier, Longueuil (CA); Benoit Orban, St-Lambert (CA); Jason Randall Ludvig, Hampstead (CA); Shawn Jordan Fried, Montreal (CA); Nektaria Markoglou, Montreal (CA)

(73) Assignee: MEDICOM GROUP INC., Pointe-Claire (CA)

( * ) Notice: Subject to any disclaimer, the term of this patent is extended or adjusted under 35 U.S.C. 154(b) by 144 days.

(21) Appl. No.: 17/005,543

(22) Filed: Aug. 28, 2020

(65) Prior Publication Data

US 2022/0061956 A1 Mar. 3, 2022

(51) Int. Cl.
*A61C 5/85* (2017.01)

(52) U.S. Cl.
CPC ...................................... *A61C 5/85* (2017.02)

(58) Field of Classification Search
CPC .... A61C 5/85; A61C 5/80; A61C 5/82; A61C 5/88; B25B 13/52; B25B 27/0042
See application file for complete search history.

(56) References Cited

U.S. PATENT DOCUMENTS

| | | | | |
|---|---|---|---|---|
| 2,367,439 | A * | 1/1945 | Samphere | A61C 5/85 |
| | | | | 433/155 |
| 2,400,172 | A * | 5/1946 | Siqveland | A61C 5/85 |
| | | | | 433/155 |
| 2,560,553 | A * | 7/1951 | Christie | A61C 5/85 |
| | | | | D24/176 |
| 5,055,045 | A | 10/1991 | Dickie et al. | |
| 5,342,197 | A | 8/1994 | Stein et al. | |
| 6,234,793 | B1 | 5/2001 | Brattesani et al. | |
| 8,517,732 | B2 | 8/2013 | Segal et al. | |
| 2006/0003289 | A1 | 1/2006 | Schaffner | |
| 2011/0244421 | A1 | 10/2011 | Segal et al. | |

FOREIGN PATENT DOCUMENTS

WO 2010/061161 A1 6/2010

* cited by examiner

*Primary Examiner* — Edward Moran
(74) *Attorney, Agent, or Firm* — Rothwell, Figg, Ernst & Manbeck, P.C.

(57) ABSTRACT

Dental matrix band devices including a housing with a band, a tensioning device for the band with the control for the tensioning mechanism controllable by a control knob external to the housing, and at least one deflector pushbutton. The deflector pushbutton(s) applies pressure on an upper or lower portion of the band causing the geometry of the band to change. The resulting band geometry forms a conical loop better matching the configuration of a tooth. In one embodiment two deflector pushbuttons are provided and positioned to apply pressure on the upper or lower portion of the band depending on which deflector pushbutton is depressed in the housing. In another embodiment a single deflector pushbutton unit is provided with a pushbutton at each end.

14 Claims, 8 Drawing Sheets

DENTAL BAND DEVICE

BACKGROUND

Various dental band devices are known to allow a dentist to clamp a matrix band around a tooth while filling a cavity on a side of a tooth. These known devises are configured and operate in different ways. The device disclosed and claimed provides a novel and more efficient easier to operate the dental band device.

SUMMARY

Disclosed are dental matrix band devices which include a deflector mechanism to change the band geometry in a way to create a conical shape adapted to a particular tooth shape of a patient. Two different deflector mechanisms for changing the geometry of the band are disclosed. The first embodiment includes 2 deflector pushbuttons each of which is controlled by a pushbutton that is accessed external to the housing of the device. The second embodiment provides a single deflector with a pushbutton at each end and accessed on opposite sides of the external portion of the housing. For both embodiments the selection of which push button is pushed determines the portion of the band to which pressure is provided and thus changing the geometry/configuration of the band around the tooth.

BRIEF DESCRIPTION OF THE DRAWINGS

For a better understanding of the embodiments described herein and to show more clearly how they may be carried into effect, reference will now be made, by way of example only, to the following drawings.

Figure 1:
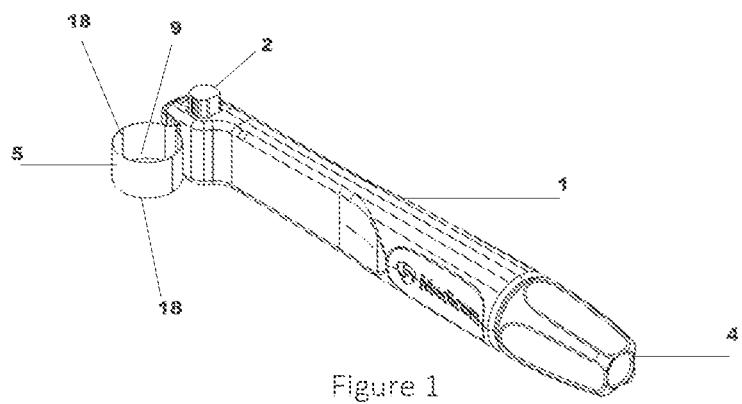
FIG. 1 illustrates a perspective of the dental matrix band

It will be appreciated that for simplicity and clarity of illustration, elements shown in the figures have not necessarily been drawn to scale. For example, the dimensions of some of the elements may be exaggerated relative to other elements for clarity.

PARTS LIST

1—Housing
2—Upper Deflector Pushbutton
3—Lower Deflector Pushbutton
4—Band Control Knob
5—Band
6—Top of Housing
7—Bottom of Housing
8—Tensioning Mechanism
9—Band Loop
10—Screw Type Device
11—Front End of Housing
12—Rear End of Housing
13—Front End of Tensioning Mechanism
14—Rear End of Tensioning Mechanism
15—First Band End
16—Second Band End
17—Single Deflector Pushbutton
18—Upper Portion of Band
19—Lower Portion of Band
20—Band Securing Mechanism
21—Central Recessed Portion
22— Upper and Lower Non-Recessed Portions

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The terms "coupled", "coupling", "attached", "attachment", or variants thereof as used herein can have several different meanings depending in the context in which these terms are used. For example, the terms coupled, coupling, attached, or attachment can have a mechanical connotation. For example, as used herein, the terms coupled, coupling, attached, or attachment can indicate that two elements or devices are directly connected to one another or connected to one another through one or more intermediate elements or devices via a mechanical element depending on the particular context.

The assembled dental matrix band device shown on FIG. 1 depicts an elongated housing (1), an upper pushbutton deflector (2), a band (5), and a band control knob (4). As shown on FIG. 2 the housing (1) typically includes a top (6) and a bottom (7) which are connected together after the internals are mounted. Mounted in the housing (1) are internals including a band (5), an upper deflector pushbutton (2), a lower deflector pushbutton (3), and a tensioning mechanism (8). A portion of the band (5) extends beyond a front end (11) of the housing (1) and forms a loop (9) designed to encircle a tooth.

Figure 2:
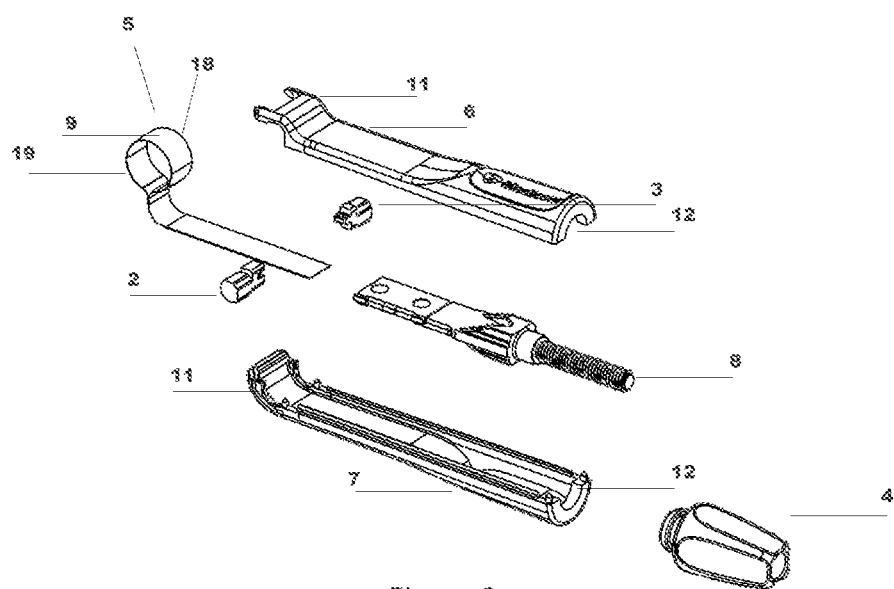
FIG. 2 illustrates a perspective exploded view of the primary parts of a dental matrix band with two deflector pushbuttons.

In the device as shown on FIG. 2 the deflector pushbuttons (2) & (3) are mounted transversely to the longitude length of the housing (1) at the housing's front end (11). A portion of each deflector pushbutton (2, 3, & 17) extends beyond the housing (1) and a remaining portion of each deflector pushbutton is in the housing (1) adjacent to a portion of the band (5). The deflector pushbuttons are mounted such that they can apply pressure to a different portion of the band (5) depending on which pushbutton is pushed into the housing (1). Applying pressure to an upper portion (18) or a lower portion (19) (FIG. 6) of the band (5) changes the geometry of the band to better match the geometry of the tooth.

Figure 6:
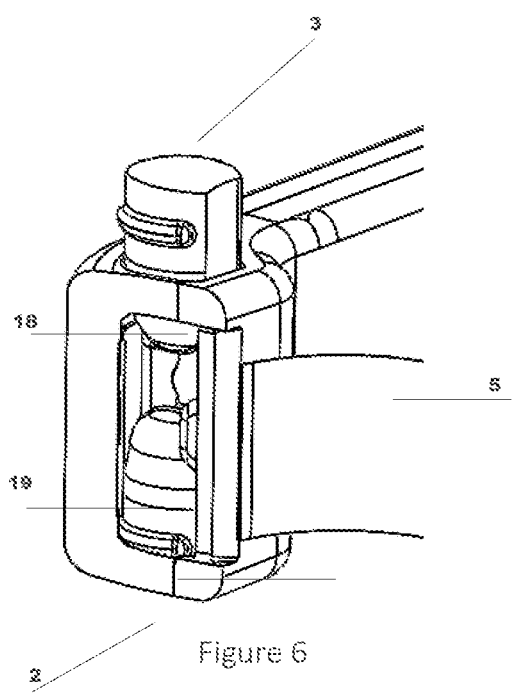
FIG. 6 illustrates a section view of the band and deflector.
Figure 7:
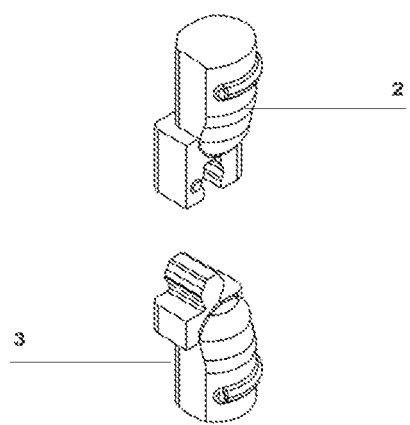
FIG. 7 illustrates an example of the two defector pushbuttons.

The deflector pushbuttons can be configured with a pushbutton as an integral part of the deflector pushbutton or the pushbutton can be a separate part attached to the deflector. FIGS. 6 & 7 illustrate one possible configuration of the upper deflector pushbutton and the lower deflector pushbutton, and their assembly in the housing (1). As depicted on FIGS. 6 & 7 the upper and lower deflector pushbuttons can be interlocked.

Figure 5:
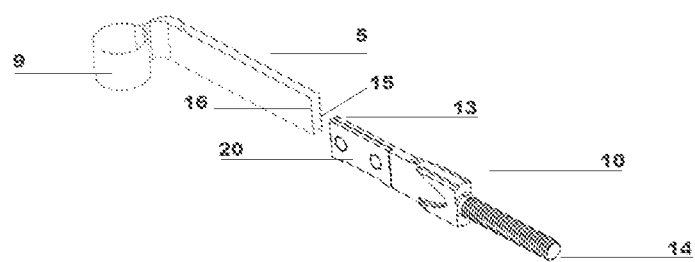
FIG. 5 illustrates an exploded view of the band and tensioning mechanism.

A tensioning mechanism (8) is provided to control the size of the loop (9) of the band (5). A band securing mechanism (20) is also provided. FIG. 2 shows as one example of a tensioning mechanism (8) a screw type device (10) attached to or configured as a part of a rear end (14) of the tensioning mechanism (8). The band (5) is provided with two ends as shown on FIG. 5 with one or both ends of the band (5) connected to a front end (13) of the tensioning mechanism (8). If only one end of the band (5)) is connected to the tensioning mechanism (8) the other end of the band (5) is securely attached to the housing (1). The rear end (14) of the tensioning mechanism (8) extends out of an opening in the rear end (12) of the housing (1) and is attached to a band control knob (4). Rotation of the band control knob controls the length of the diameter of the band loop (9).

Depressing the upper deflector pushbutton (2) causes the deflector to apply pressure on an upper portion (18) of the band (5). If the lower deflector pushbutton (3) of the deflector (2) is pushed into the housing (1) it causes the deflector to apply pressure on the lower portion (19) of the band (5). Thus, the movement of the deflector pushbuttons (2), (3), and (17) creates a conical shape around the tooth due to pressure on only an upper (16) or lower (15) portion of the band (5).

Figure 3:
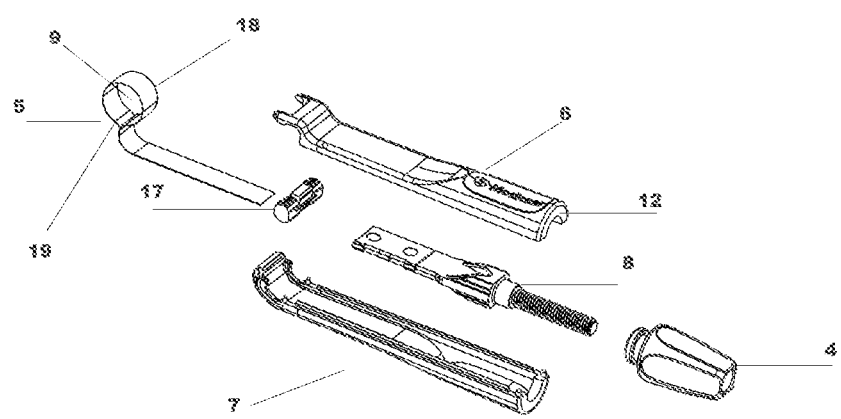
FIG. 3 illustrates perspective exploded view of the primary parts for second embodiment of a dental matrix band with one deflector pushbutton.
Figure 4:
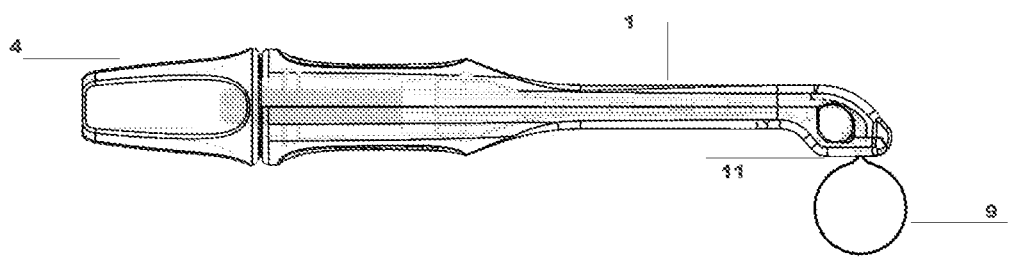
FIG. 4 illustrates a side view of a dental matrix band.
Figure 8:
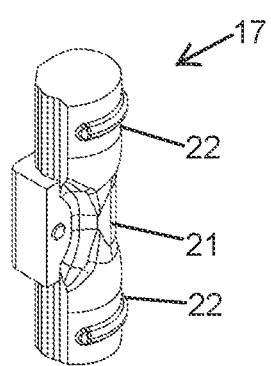
FIG. 8 illustrates an example of the single defector pushbutton.

In the embodiment shown on FIGS. 3 and 8 a single deflector pushbutton (17) can be utilized in the dental matrix band device. The single deflector (17) can be configured with an integral pushbutton at each end of the deflector designed to extend beyond the housing or a separate pushbutton piece can be attached to each end of the deflector and designed to extend beyond the housing (1). The single pushbutton comprises a portion internal to the housing comprising upper and lower non-recessed portions (22) and a central recessed portion (21) in between the upper and lower non-recessed portions (22). The single deflector pushbutton applies a pressure to an upper portion of the band or to a lower portion of the band depending on which end of the single deflector pushbutton (17) is inserted into the housing (1). Both the single pushbutton deflector (17) embodiment and the two pushbutton deflectors (2 & 3) embodiment have the same functionality as disclosed and illustrated.

One embodiment of the Dental Matrix Band includes:

A housing with a top, a bottom, a front end, and a rear end; a band with two ends mounted in the housing with a portion of the band extending beyond the front end of the housing and forms a loop designed to encircle a tooth. An upper deflector pushbutton is mounted transversely to a longitudinal length of the housing. A portion of the upper deflector pushbutton extends beyond the top of the housing, and a portion of the upper deflector pushbutton is positioned adjacent to the band and designed to change a geometry of the band by applying pressure to a portion of the band.

A lower deflector pushbutton is mounted transversely to a longitudinal length of the housing. A portion of the lower deflector pushbutton extends beyond the bottom of the housing, and a portion of the lower deflector pushbutton is positioned adjacent to the band and designed to change a geometry of the band by applying pressure to a portion of the band.

A tensioning mechanism is attached to the band and designed to control the length of a diameter of the loop extending beyond the front end of the housing.

Another embodiment includes:

A housing with a top, a bottom, a front end and a rear end; a band with two ends mounted in the housing with a portion of the band extending beyond the front end of the housing and forming a loop designed to encircle a tooth. A single deflector pushbutton with a first end and a second end is mounted transversely to a longitudinal length of the housing. The first end of the deflector pushbutton extends beyond the top of the housing and the second end of the deflector pushbutton extends beyond the bottom of the housing. A portion of the single deflector pushbutton is positioned adjacent to the band and designed to change a geometry of the band by applying pressure to a portion of the band. A tensioning mechanism is attached to the band and designed to control the length of a diameter of the loop extending beyond the front end of the housing.

The above is a detailed description of particular embodiments of the invention. It is recognized that departures from the disclosed embodiments may be made within the scope of the invention and that obvious modifications will occur to a person skilled in the art. Those skilled in the art should, in light of the present disclosure, appreciate that many changes can be made in the specific embodiments which are disclosed herein and still obtain a like or similar result without departing from the spirit and scope of the invention. All the embodiments disclosed and claimed herein can be made and executed without undue experimentation in light of the present disclosure.

The invention claimed is:

1. A dental matrix band comprising:
a housing including a top, a bottom, a front end, and rear end, wherein the top and the bottom are connected together;
a band mounted in the housing, wherein the band includes first and second portions, the first portion of the band is internal to the housing and between the top and the bottom of the housing, and the second portion of the band extends beyond the front end of the housing, is external to the housing, and forms a loop configured to encircle a tooth;
a single pushbutton mounted perpendicularly to a longitudinal length of the housing, wherein:
the single pushbutton includes a first end and a second end,
the first end of the single pushbutton extends beyond a first side of the housing,
the second end of the single deflector pushbutton extends beyond the bottom a second side of the housing that is opposite to the first side of the housing,
a portion of the single pushbutton is internal to the housing, between the top and the bottom of the housing, and positioned adjacent to the band, and
the first and second ends of the single pushbutton are configured to be pushed into the housing in a direction perpendicular to the longitudinal length of the housing, wherein pushing the first end of the pushbutton toward the housing applies pressure to an upper portion of the band creating a conical shape of the band around the tooth, and pushing the second end of the pushbutton toward the housing applies pressure to a lower portion of the band creating a conical shape of the band around the tooth; and
a tensioning mechanism attached to the band and configured to control the length of a diameter of the loop extending beyond the front end of the housing.

2. The dental matrix band according to claim 1, wherein the tensioning mechanism is attached to at least one end of the band and includes a band securing mechanism to adjust and secure the length of the band.

3. The dental matrix band according to claim 2, wherein the tensioning mechanism is a screw type device and the band securing mechanism is a band control knob extending beyond the rear end of the housing enabling turning of the band control knob to control the length of the band by moving the screw type device.

4. The dental matrix band according to claim 1, wherein the portion of the single pushbutton includes upper and lower non-recessed portions and a central recessed portion in between the upper and lower non-recessed portions.

5. The dental matrix band according to claim 1, wherein the band consists of the first and second portions.

6. The dental matrix band according to claim 1, wherein the top of the housing extends from the first side of the housing to the second side of the housing, and the bottom of the housing extends from the first side of the housing to the second side of the housing.

7. A dental matrix band comprising:
a housing including a top, a bottom, a front end, and rear end, wherein the top and the bottom are connected together;
a band mounted in the housing wherein the band includes first and second portions, the first portion of the band is internal to the housing and between the top and the bottom of the housing, and the second portion of the band extends beyond the front end of the housing, is external to the housing, and forms a loop configured to encircle a tooth;
a single pushbutton mounted perpendicularly to a longitudinal length of the housing, wherein:
the single pushbutton includes a first end and a second end,
the first end of the single pushbutton extends beyond a first side of the housing,
the second end of the single pushbutton extends beyond a second side of the housing that is opposite to the first side of the housing,
a portion of the single pushbutton is internal to the housing, between the top and the bottom of the housing, and positioned adjacent to the band, and
the first and second ends of the single pushbutton are configured to be pushed into the housing in a direction perpendicular to the longitudinal length of the housing, wherein pushing the first end of the pushbutton toward the housing applies pressure to an upper portion of the band creating a conical shape of the band around the tooth, and pushing the second end of the pushbutton toward the housing applies pressure to a lower portion of the band creating a conical shape of the band around the tooth.

8. The dental matrix band according to claim 7, wherein the portion of the single pushbutton includes upper and lower non-recessed portions and a central recessed portion in between the upper and lower non-recessed portions.

9. The dental matrix band according to claim 7, wherein the band consists of the first and second portions.

10. The dental matrix band according to claim 7, wherein the top of the housing extends from the first side of the housing to the second side of the housing, and the bottom of the housing extends from the first side of the housing to the second side of the housing.

11. A dental matrix band comprising:
a housing including a top, a bottom, a front end, and rear end, wherein the top and the bottom are connected together;
a band mounted in the housing wherein the band includes first and second portions, the first portion of the band is internal to the housing and between the top and the bottom of the housing, and the second portion of the band extends beyond the front end of the housing, is external to the housing, and forms a loop configured to encircle a tooth;
a single pushbutton mounted in the housing, wherein:
the single pushbutton comprises a first end and a second end,
the first end of the single pushbutton extends beyond a first side of the housing,
the second end of the single pushbutton extends beyond a second side of the housing that is opposite to the first side of the housing,
a portion of the single pushbutton is internal to the housing, is between the top and the bottom of the housing, is positioned adjacent to the band, and comprises upper and lower non-recessed portions and a central recessed portion in between the upper and lower non-recessed portions, wherein the portion of the single pushbutton is configured to change a geometry of the band by applying pressure to an upper or lower portion of the band depending on which end of the single pushbutton is pushed into the housing, and
the first and second ends of the single pushbutton are configured to be pushed into the housing in a direction perpendicular to a longitudinal length of the housing.

12. The dental matrix band according to claim 11, further comprising a tensioning mechanism attached to the band and designed to control the length of a diameter of the loop extending beyond the front end of the housing.

13. The dental matrix band according to claim 11, wherein inserting the first end of the pushbutton into the housing applies pressure to an upper portion of the band creating a conical shape of the band around the tooth; and inserting the second end of the pushbutton into the housing applies pressure to a lower portion of the band creating a conical shape of the band around the tooth.

14. The dental matrix band according to claim 11, wherein the band consists of the first and second portions.

* * * * *